(12) United States Patent
Appa et al.

(10) Patent No.: US 7,789,624 B2
(45) Date of Patent: Sep. 7, 2010

(54) METHODS AND DEVICES FOR IMPROVING EFFICIENCY OF WIND TURBINES IN LOW SPEED SITES

(76) Inventors: Kari Appa, 22242 Anthony Dr., Lake Forest, CA (US) 92630; Suri Appa, 22242 Anthony Dr., Lake Forest, CA (US) 92630

( * ) Notice: Subject to any disclaimer, the term of this patent is extended or adjusted under 35 U.S.C. 154(b) by 796 days.

(21) Appl. No.: 11/800,254

(22) Filed: May 3, 2007

(65) Prior Publication Data

US 2007/0207033 A1    Sep. 6, 2007

Related U.S. Application Data

(63) Continuation-in-part of application No. 11/366,976, filed on Mar. 3, 2006, now abandoned.

(51) Int. Cl.
*F03D 7/02* (2006.01)
(52) U.S. Cl. .............. 416/41; 416/51; 416/137
(58) Field of Classification Search ............ 416/41, 416/51, 136, 137, 153, 206, 207, 248
See application file for complete search history.

(56) References Cited

U.S. PATENT DOCUMENTS

| 1,986,752 | A | * | 1/1935 | Rorvik ............ 416/89 |
| 2,033,342 | A | | 3/1936 | Lansing et al. |
| 3,160,017 | A | | 12/1964 | Weiss |
| 4,137,009 | A | | 1/1979 | Telford |
| 4,495,423 | A | * | 1/1985 | Rogers ............ 290/44 |
| 4,952,119 | A | * | 8/1990 | Widseth ............ 416/3 |
| 5,286,166 | A | * | 2/1994 | Steward ............ 416/89 |
| 6,761,533 | B2 | * | 7/2004 | Favaro ............ 416/51 |
| 2003/0116970 | A1 | | 6/2003 | Weitkamp et al. |
| 2003/0223868 | A1 | | 12/2003 | Dawson et al. |

* cited by examiner

*Primary Examiner*—Edward Look
*Assistant Examiner*—Ryan H Ellis
(74) *Attorney, Agent, or Firm*—Allan Grant; Grant's Law Firm (57) ABSTRACT

The present invention is for an apparatus and method for a passive pitchable device for wind turbines comprising: a camshaft having cam grooves engraved; a cylindrical shell; an axial compression spring; said blade assembly and said cylindrical shell are fastened together by screws; a plurality of balls that roll along said cam grooves, and convert the axial displacement to rotation or pitch angle; and wherein the passive pitchable device ensures said blades are at the optimum angle of incidence in the stationary position; as the rotor turns, the net force between centrifugal force on said blade and the resistant force from said compression spring causes the device to move axially outward while rotating to adjust the pitch of the rotor blade so that angle of incidence is optimal for the given wind speed; as the wind speed exceeds the design speed and the centrifugal force on the rotor blade continues to increase, the device continues the move axially outward while rotating in the opposite direction as to adjust the pitch of the blade in the opposite direction so that the rotor performance is controlled and severe dynamic loads are avoided.

13 Claims, 8 Drawing Sheets

METHODS AND DEVICES FOR IMPROVING EFFICIENCY OF WIND TURBINES IN LOW SPEED SITES

CROSS-REFERENCE TO RELATED APPLICATIONS

This is a continuation in part patent application which claims priority under 35 U.S.C. 120 and under applicable U.S. statutes and regulations, to U.S. patent application Ser. No. 11/366,976, filed Mar. 3, 2006 now abandoned. The disclosure of which is hereby incorporated herein by reference in its entirety.

FIELD OF THE INVENTION

The present invention relates to a novel design of wind turbine blades in which there is a centrifugal force-controlled passive pitching device and forward swept blade tips. In low wind conditions this device enables feathering of the blade for easy starting of the rotor. In high wind conditions it controls the power imparted to the turbine to avoid encountering severe dynamic loads. The forward swept tips allow for noise reduction without sacrificing aerodynamic efficiency.

DESCRIPTION OF PRIOR ART

The present invention relates generally to the design, manufacture, and operation of passively pitchable wind turbine blades with respect to improving power extraction efficiency at all wind speeds, including low wind speed conditions. These innovations in particular are applicable to small wind turbines, large utility scale single rotor and contra rotor wind turbines.

In recent years, it has become apparent that conventional methods of generating electricity will soon be insufficient to meet the world's ever-growing need for electric power. Serious concerns about the environmental and safety hazards of fossil fuel and nuclear energy are driving the development for clean alternative sources of energy. Such clean alternatives include hydroelectric, biomass, solar, and wind power. Since high wind areas are limited, there is a need to improve the efficiency of wind turbines to enable electric power generation in low wind speed conditions.

A search of the Internet and literature reveals that several technological advances have been made to improve the performance of both large and small wind turbines over the past two decades. Previously, problems included inefficient operation at low wind speeds and unsafe operation at high wind speeds. It is known that rotor blade aerodynamic efficiency and cut-in wind speed are related to the blade angle of incidence and the optimal angle of blade setting varies according to wind speed. Therefore, in order to maximize energy production for a wind turbine exposed to variable wind speeds, it is necessary to adjust the pitch of the blades as the wind speed changes, so that the blade always operates at an optimal angle of incidence with respect to the relative wind speed. Thus, the resulting lift to drag ratio maximizes energy production at low wind speeds, which occurs with the highest probability in most areas. At high wind speeds, it becomes necessary to control the load on the blades to prevent damage to the structure itself. This can be achieved by adjusting the pitch of the blades such that the load on the blades is minimized while still extracting rated power.

Utility scale wind turbines use active servo-controls to achieve this goal. Such active servo-controls are too costly to implement in small wind turbines. Therefore, the present day small turbine manufacturers use fixed blade settings, which may work well for a narrow range of wind speeds. Sometimes the wind speed changes so quickly that a small wind turbine rotor stops abruptly.

When the rotor is stationary, the turbine is essentially in a stalled state and all sections of the blade from root to tip are facing the wind at a high angle of incidence. The drag forces at tip sections oppose any torque generated at the root sections. Consequently, there is not enough torque to overcome the generator bearing friction and its magnetic cogging-torque and thus small turbines fail to self-start in low wind speed conditions.

Some small wind turbine manufacturers claim that their turbines are designed for "passive pitch control" even though the blades are fixed to the rotor. Such a claim can be made if the blades are designed for "elastic twist." which is generally limited to only about 1 to 3 degrees at the tip. In order to achieve optimal performance in off-design conditions, the required blade-feathering angle needs to be at least 30 to 60 degrees.

A study by Hertel, Nygaard and Duque (AIAA-2004-1369) describes a method of passive pitch control of small turbines, in which there is an offset mounting of the blades from the axis of rotation. This approach however does not help self-starting in low wind conditions.

Noise reduction in turbines with straight blades is achieved by reducing the rotor speed. The negative effect of this is reduced power generation. Southwest Windpower in collaboration with National Wind Technology Center has developed a state-of-the-art 1.8 kW wind turbine, the "STORM", which applied the concept of swept-back leading edges to reduce noise. It is claimed that it provides high energy capture at rated wind speed, but it is not clear how this compares to a similar machine with straight blades.

Of note, swept blade tip configurations are also used in the helicopter industry (e.g. Sikorsky's Black Hawk and Boeing Apache) to reduce compressibility effects and noise level. More recently, British EF-101 and Westland Lynx Mk7 used forward and aft swept leading edges.

In the case of an aft-swept wing or blade, there is flow separation at the wing tip leading to reduced control effectiveness. Moreover, strong tip vortex shedding results in high induced drag which opposes the torque and reduces power. Thus the tip section of an aft-swept blade, although reduces noise, becomes aerodynamically less efficient.

In the case of a forward swept wing, the flow near the wing tip is very clean and there is no tip vortex shedding. The boundary layer thickening grows towards the wing root. Thus the control surfaces located near the wing tip are aerodynamically very efficient and the induced drag is minimized. Therefore, forward swept blades are superior to aft swept blades as a method of noise reduction.

A few patents are typical of the known prior art attempting to improve on earlier efforts to harness wind energy. For example, U.S. Pat. No. 4,408,958 to Schacle discloses a wind turbine blade with substantially curved (highly cambered) airfoil near leading and trailing edges at root sections of the blade. Although this invention can help generate some torque at low wind speeds, the outboard sections do facilitate an easy-start and the rotor is likely to remain at a stalled condition at very low wind speeds. U.S. Pat. No. 4,427,897 to Migliori discloses a fixed pitch wind turbine system, which utilizes aerodynamic stall to minimize air load on the blades in high wind conditions. But, this approach again, would not help self-start in low wind speed conditions. U.S. Pat. No. 6,609,889 B1 to Vilsboll discloses a method and device for adjusting the blade pitch and stopping the rotation of the blades at high wind speed conditions using a motor driven mechanism.

U.S. Pat. No. 5,506,453 issued to McCombs, also describes a passively pitchable device (FIGS. 7, 8 and 9), which involves an extremely complex system. The S-like cam groove aligned nearly in the axial direction, as seen in FIG. 9, can only swivel the blade in one direction like any other torsion spring controlled mechanical devices. To control the blade loading in high winds, McCombs suggests a separate device as described in FIG. 13, wherein a high pressure hydraulic servo-control is used. This invention has not yet been reduced to practice and it may be impractical or uneconomical for implementation in low cost small wind turbines.

SUMMARY OF THE INVENTION

In view of such problems of the prior art, the primary object of the invention is to provide a simple and economical wind turbine blade design which effectively achieves easy-starting from a stationary state, optimum aerodynamic efficiency at low and design wind speeds and controlled performance at high wind speeds. A secondary object of the invention is to provide a simple and economical wind turbine blade design which effectively achieves reduced noise production without sacrificing aerodynamic efficiency. The authors are currently developing such a product under funding from the California Energy Commission.

The invention features a wind turbine blade which has a passive pitching device governed by the centrifugal force of the rotor blade, the resisting force of the axial compression spring and a cam groove which determines the blade angle of incidence. The device ensures the rotor blades are at the optimum angle of incidence in the stationary position. As the rotor turns, the net force between centrifugal force on the blade and the resistant force from the compression spring causes the device to move axially outward while rotating to adjust the pitch of the rotor blade so that angle of incidence is optimal for the given wind speed. As the wind speed exceeds the design speed and the centrifugal force on the rotor blade continues to increase, the device continues the move axially outward while rotating in the opposite direction as to adjust the pitch of the blade in the opposite direction so that the rotor performance is controlled and severe dynamic loads are avoided.

The invention further features a wind turbine blade which has a forward swept leading edge configuration which deforms in an optimally designed manner to minimize vortex shedding and flow separation at the tip sections to minimize induced drag and improve aerodynamic efficiency. Thus, the blade tip section provides improved lift distribution and consequently increased power extraction capability. Composite materials such as glass and carbon fiber fabrics will be used to tailor the blade design and fabrication to avoid aeroelastic stability problems, which are generally associated with forward swept blade configurations.

Still another feature of the present invention is the provision of such a system, which minimizes the noise level (dB) due to sweep angle of the blade. The sound pressure is proportional to the fifth power of the tip speed, which is the cosine component of the sweep angle.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure. It was with the knowledge of the foregoing state of the technology that the present invention has been conceived and is now reduced to practice.

BRIEF DESCRIPTION OF THE DRAWINGS

The foregoing aspects and other features of the present invention are explained in the following description, taken in connection with the accompanying drawings, wherein.

Title of the Drawings

REFERENCE NUMERALS 11 blade
12 metallic blade insert having circular cross section
13 outer casing of the passively pitchable device
14 cam-shaft of the passively pitching device
15 helical axial spring
16 spherical ball
17 ball retainer plug
18a and 18b treaded fasteners
19 blade mounting collar
20 cotter pin
21 Cam-shaft groove
22a and 22b, Cam-shaft bearing support
23, collar bolt holes,
24a and 24b, fastener holes in blade root mounting device

DETAILED DESCRIPTION OF THE INVENTION

1. Preferred Embodiments of the Invention—Drawings

Figure 1:
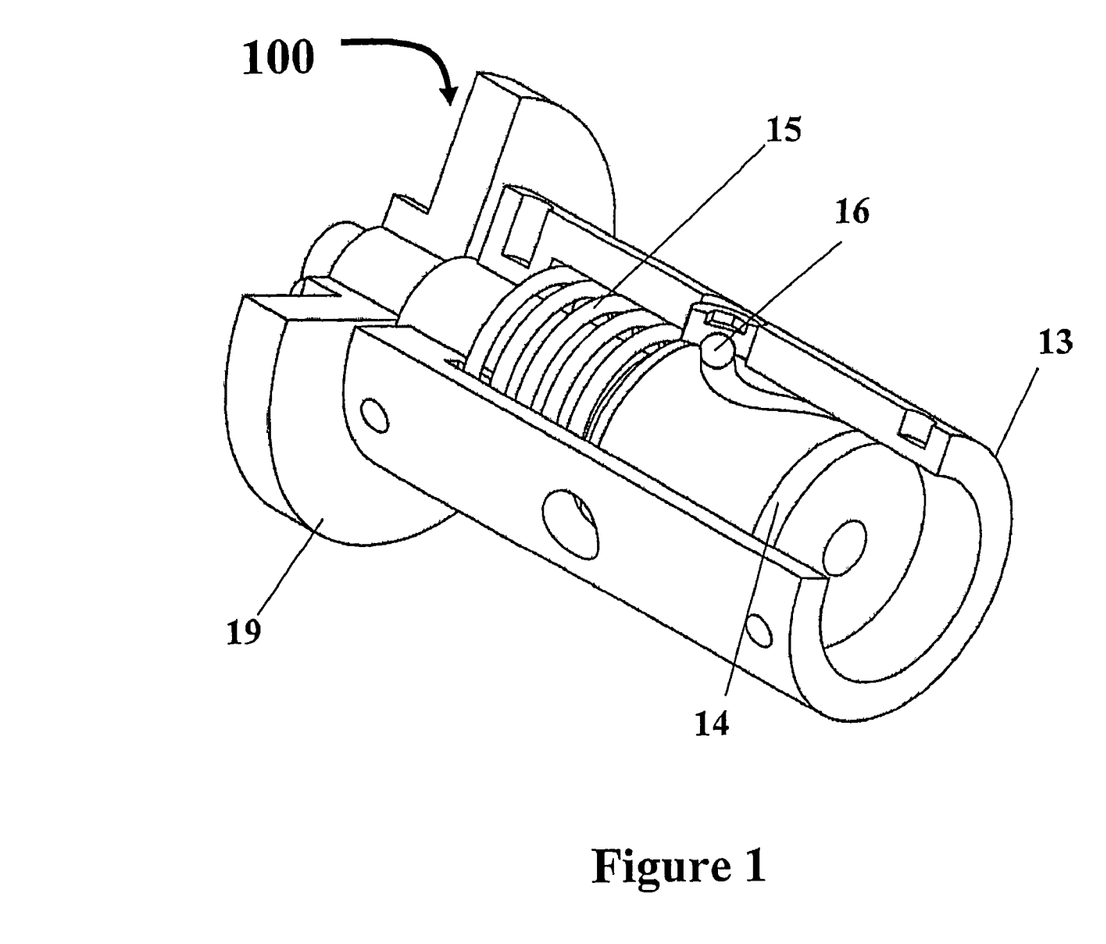
FIG. 1 is a perspective view of a passively pitchable device embodying the present invention.

FIG. 1 shows a perspective view of a passively pitchable control device 100 incorporating the features of the present invention. Although the present invention will be described with reference to a single embodiment shown in the drawings, it should be understood that the present invention can be embodied in many alternate forms of embodiments. In addition, any suitable size, shape or type of elements or materials could be used. In FIG. 1, the passive pitch control device 100 is seen to include a camshaft 101 having half sine wave like groove (as depicted in FIG. 4), a cylindrical shell 13 supporting a blade assembly 102 and an axial compression spring 15.

Figure 3:
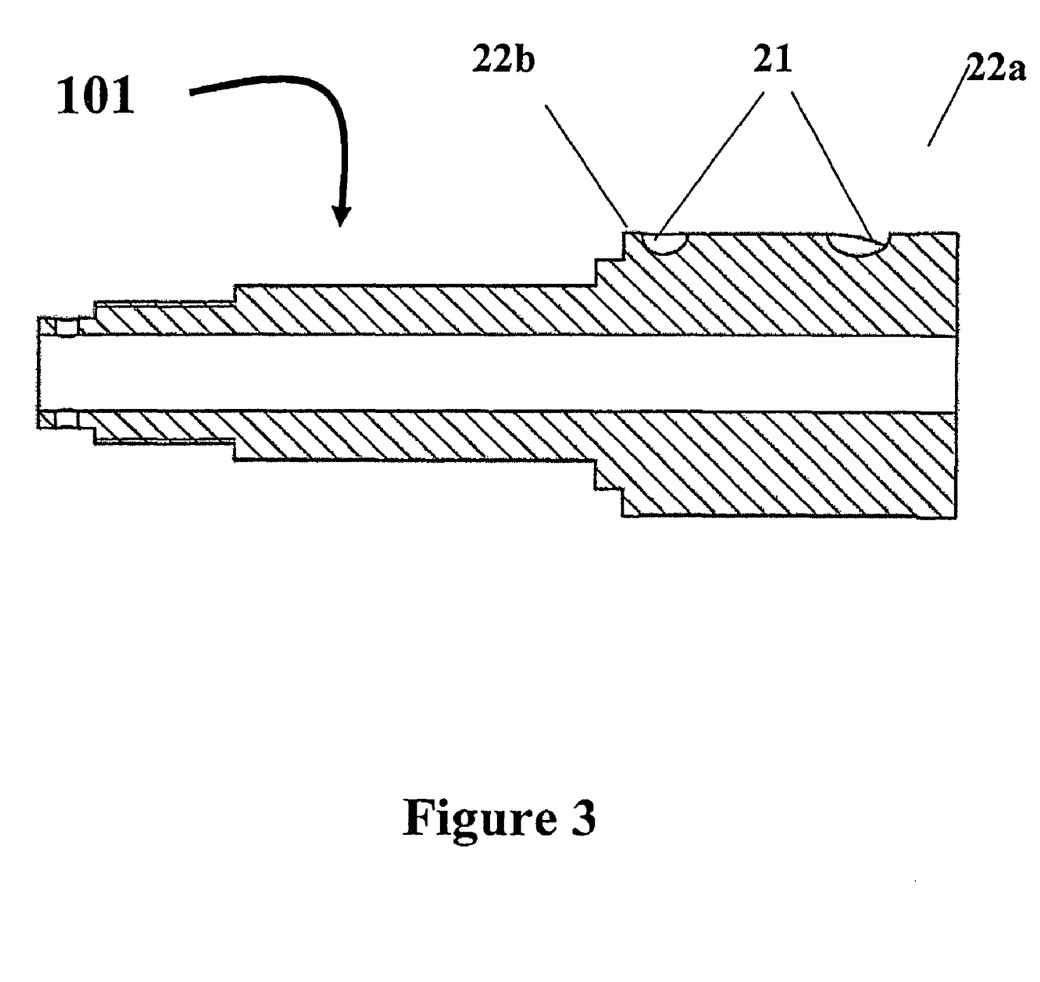
FIG. 3 is a cross section of the camshaft
Figure 4:
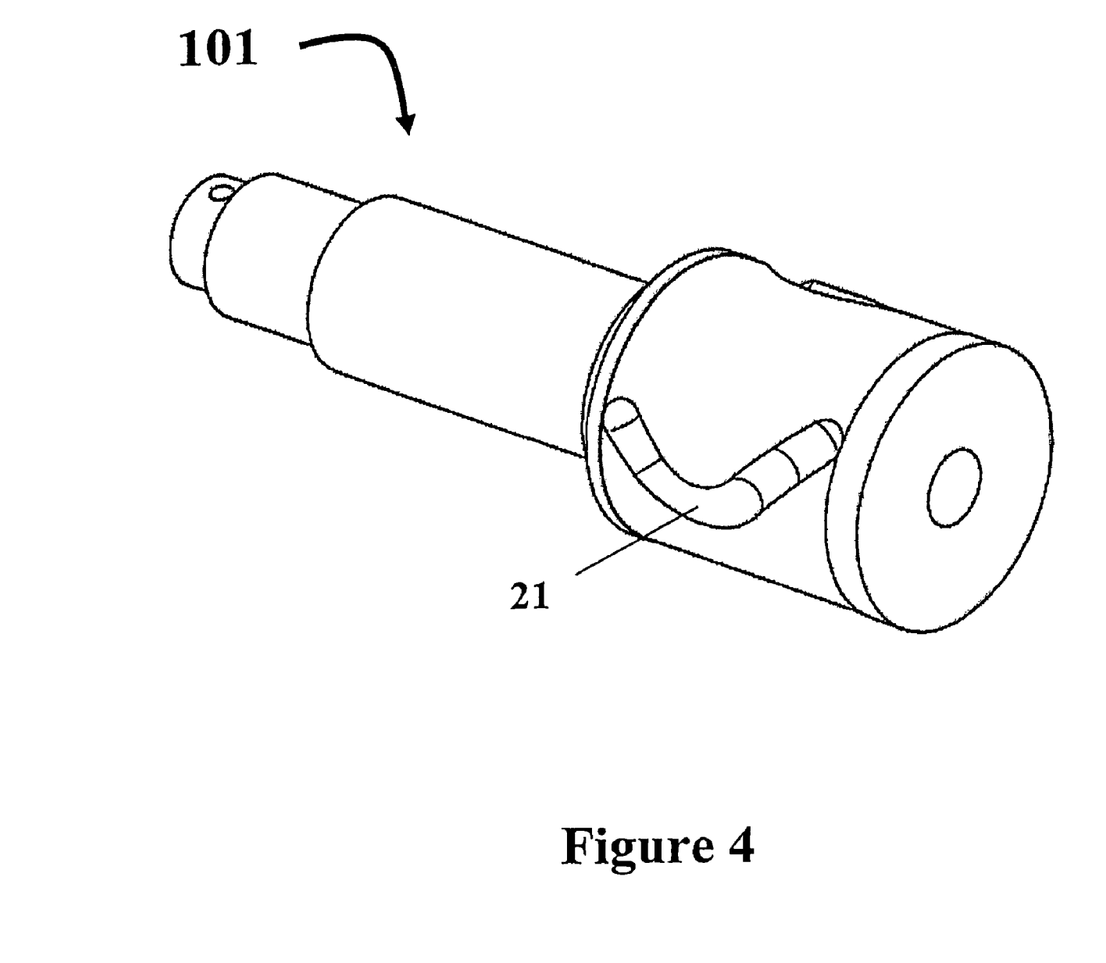
FIG. 4 is a perspective view of the cam-shaft showing the helical groove.

A cross sectional view of the camshaft 101 is shown in FIG. 3, while a 3-D rendering is shown in FIG. 4. Two sliding surfaces 22a, 22b are provided to support the shell 13 and the blade assembly 102. The blade assembly and the shell are fastened together by means of self-locking screws 18a, 18b.

2. Preferred Embodiments of the Invention—Operations

For a selected tip speed ratio, $\lambda=(\omega R/w)$ the rotor speed $\omega$ automatically changes such that the blade setting angle $\beta$, remains constant at all wind speeds. Therefore, all small wind generators are provided with fixed pitch blades. At this fixed angle, $\beta$, the rotor is unable to start easily in low wind condition or when the rotor is stationary. There must then exist a reasonable amount of wind speed to generate sufficient aerodynamic torque to overcome the alternator magnetic cogging torque and mechanical friction. Hence there is a need to feather or pitch the blade into the wind direction as shown in FIG. 7.

Figure 2:
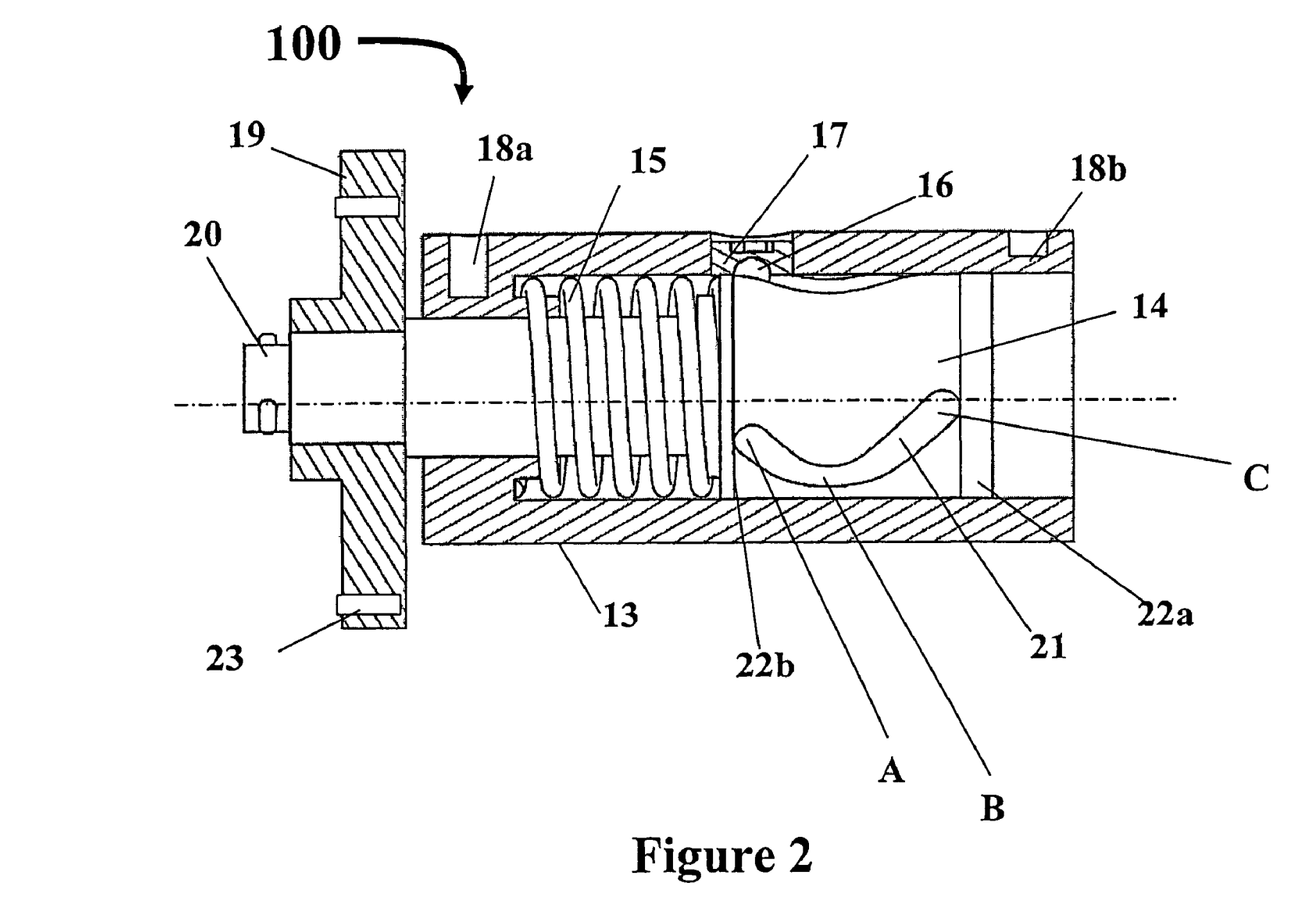
FIG. 2 is the cross section of the passively pitchable device.
Figure 8:
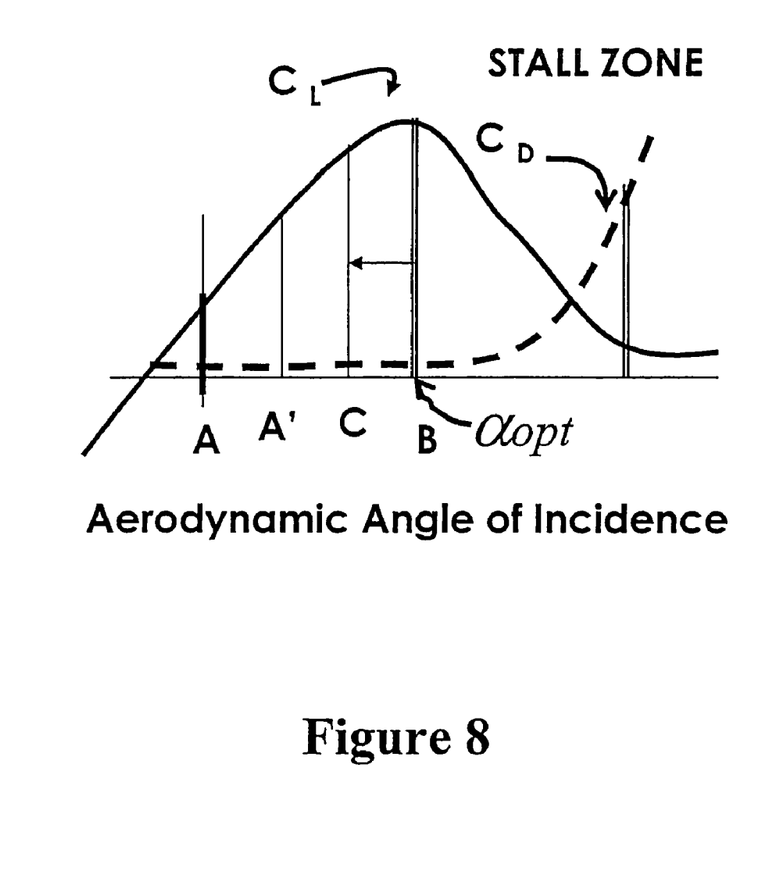
FIG. 8 a plot of the CL and Cd curves showing the blade position at various wind conditions.

FIG. 8 shows a plot of lift and drag coefficient curves of an airfoil versus angle of incidence. The operating range of the angle of incidence is given by A' to B. The design condition is selected to be at B, with an optimum angle of incidence, $\alpha_{opt}$. The region beyond B is the stalled region. Buffeting may take place causing severe dynamic oscillation. This is called the forbidden region which means that the blade setting will be restricted to less than or equal to B, the design condition. This degree of blade pitching ability (FIG. 2, cam groove from A to B in one direction and from B to C in opposite direction) becomes achievable according to the present innovation.

Figure 5:
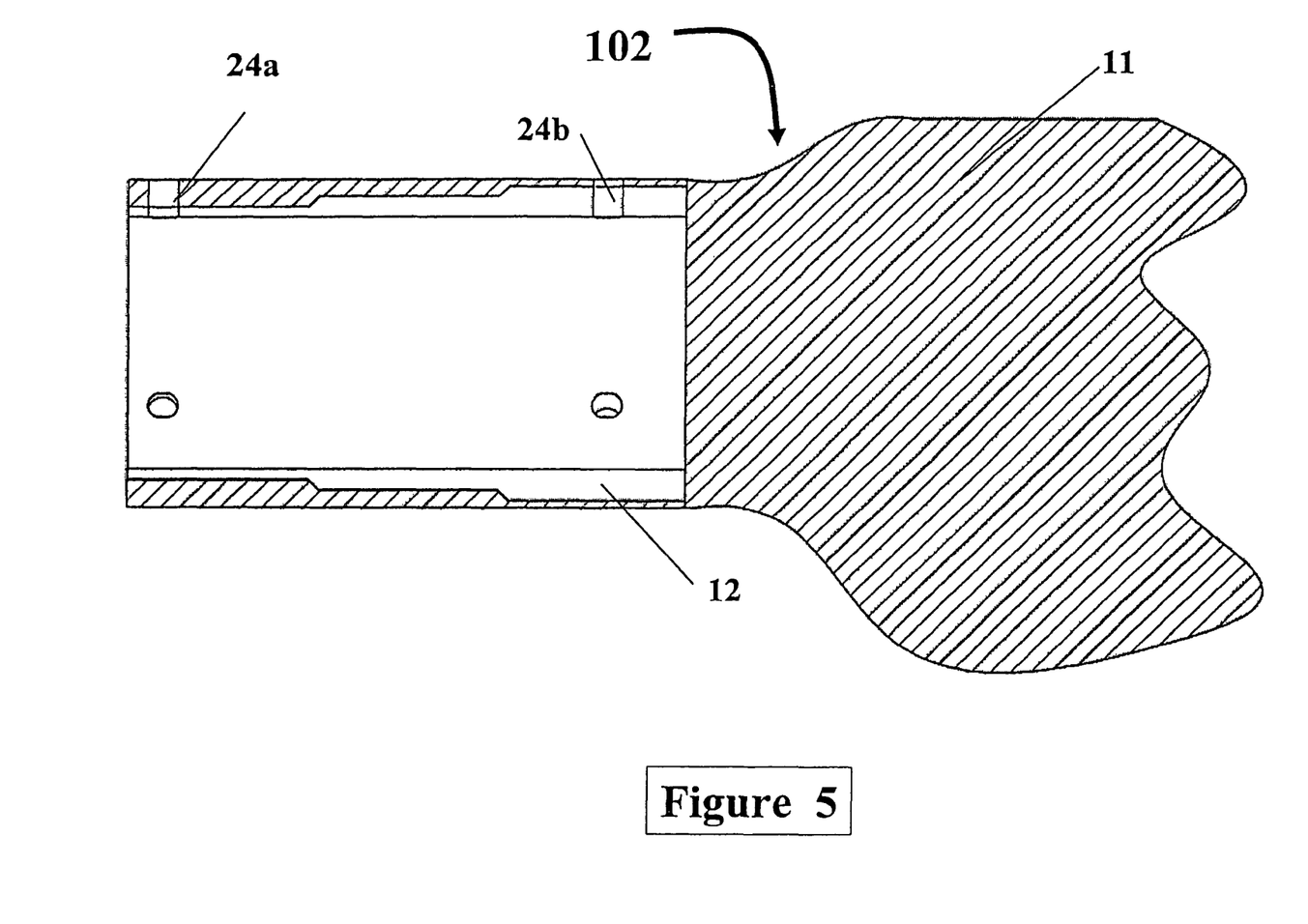
FIG. 5 a cross section of the composite blade having tubular insert.
Figure 6:
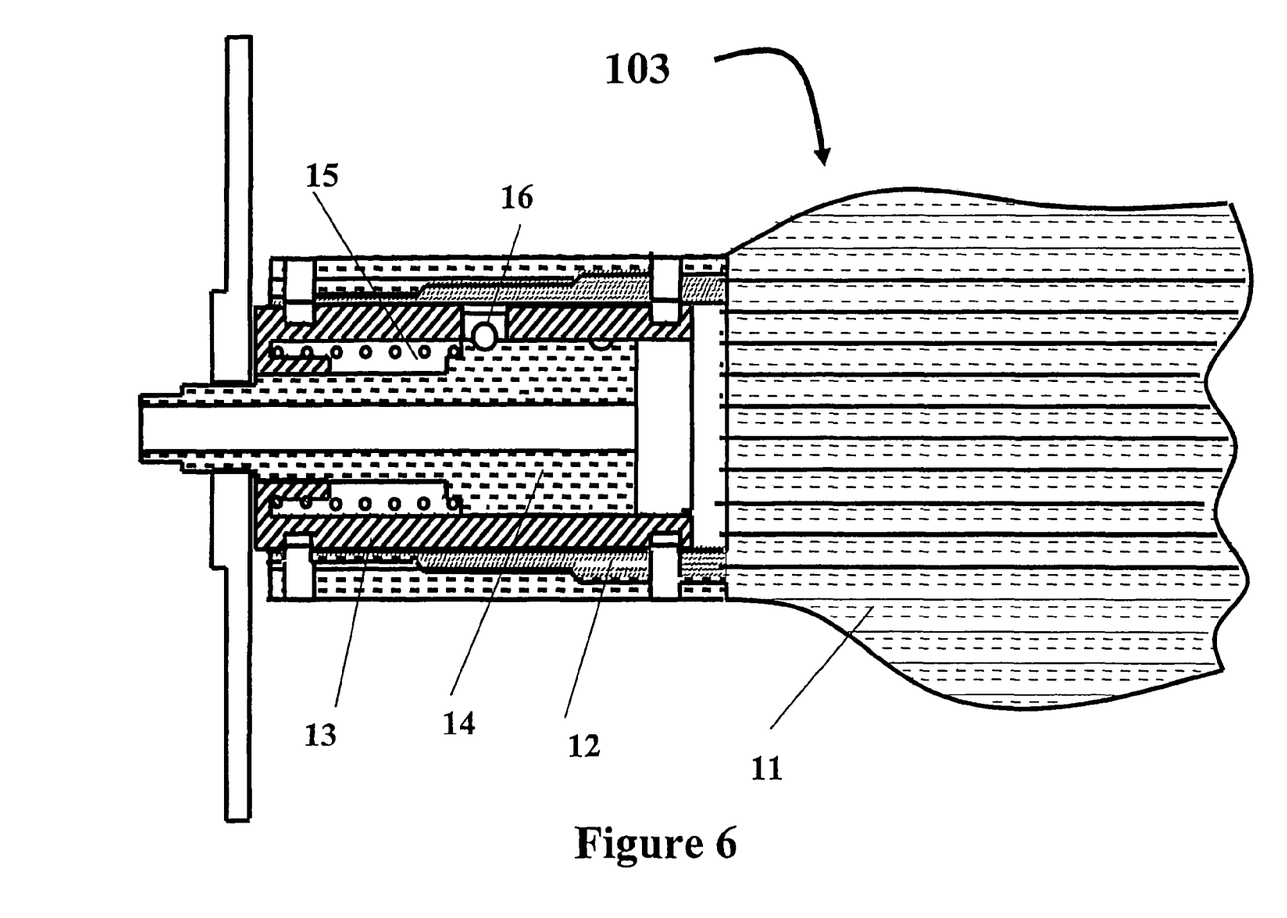
FIG. 6 is a detailed section view of a passively pitchable device by the invention.
Figure 7:
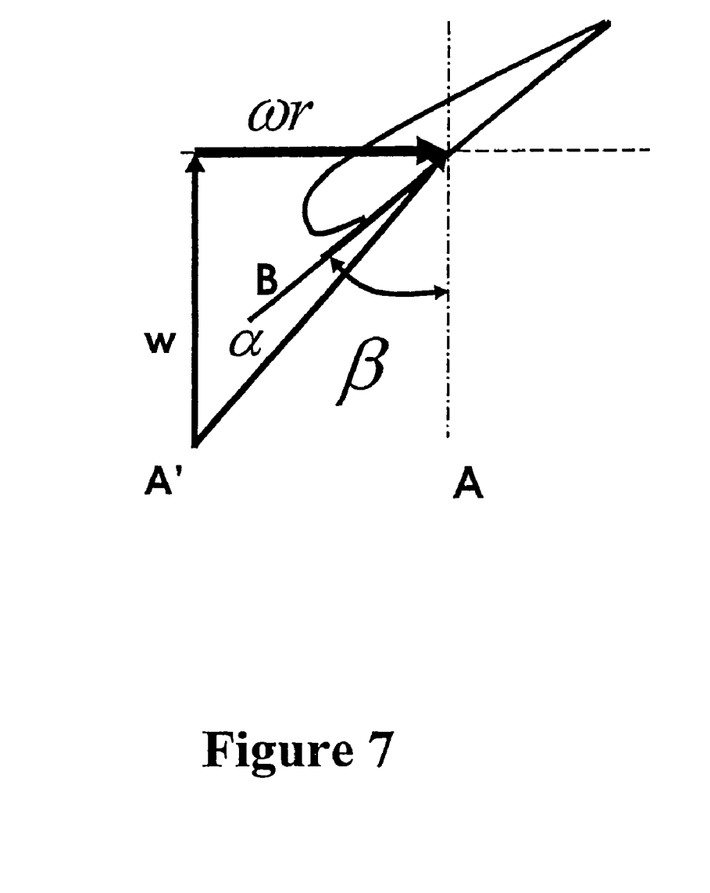
FIG. 7 is an airfoil section showing the blade angular position at a given wind speed condition.

If the rotor speed is zero, the root section of the blade 11 will be positioned at an angular position A (FIG. 7). As the wind speed sets in, aerodynamic torque builds up and the rotor begins to rotate. An axial force arising from the rotating blade pulls the shell radially outward. A plurality of spherical balls 16 rolling in a plurality of cam grooves 21 force the shell 13 and the blade assembly 102 & 103 (FIGS. 5 and 6) to pitch from the angular position A to B depending on the rotational speed of the blade and the spring rate 15. A plurality of plugs 17 having spherical cavities hold the balls in the helical track and support to transmit torque to the blade assembly 103. The position B corresponds to the design condition having high $C_L/C_D$ ratio (FIG. 8). The required axial spring stiffness for the shell 13 to travel from A to B (FIG. 2) is just enough to balance the traction friction, weight and the centrifugal force of the blade. Thus, in low wind speed condition the pitchable device enables the rotor to self-start easily.

The same passively pitchable device helps to maintain constant rated power during high wind conditions. When the rotor speed exceeds the design speed, the shell 13 will travel from the angular position B to the angular position C (FIG. 8) such that the blade turns in the opposite direction and thereby decreasing the angle of incidence. It may be necessary to use a nonlinear spring 15, in which the travel from A to B requires a softer spring rate, while that from B to C requires a stiffer spring rate.

An aeroelastic tailoring methodology must be used to compute the elastic deformation. We note that the present invention never allows the blade to be in stalled condition. Thus blades are protected from sever dynamic oscillations and consequently from fatigue failure. At extreme high winds, the camshaft position C could move as far as to cause negative angle of incidence and resulting in aerodynamic brake.

Figure 9:
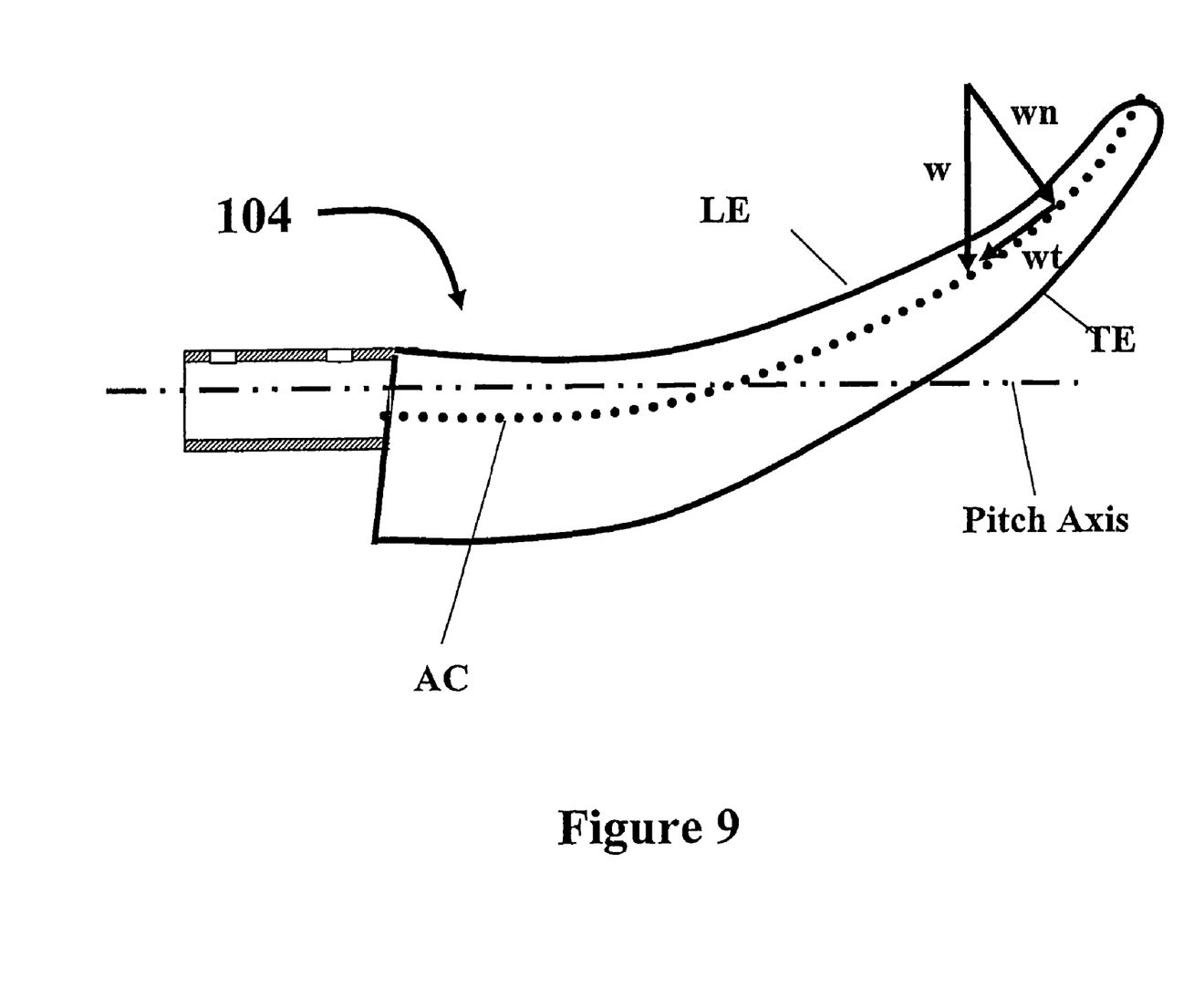
FIG. 9 is a configuration layout showing the flow pattern in a forward swept blade.

Let us now consider the merits of forward swept leading edge blade configuration depicted in FIG. 9. The free stream velocity w can be resolved into two components, one normal to the leading edge and the other along the leading edge directed towards the root, opposing the centrifugally accelerated flow. Unlike in the case of straight and swept back blades, the tip section of forward swept blade is free from shed vortices, which benefits in reducing the induced drag. Moreover, the tip section is aerodynamically very clean and generates increased aerodynamic torque and power. A similar trend has been observed in the case of forward swept wings. A rotating blade generates radial flow and a pressure gradient. The pressure gradient is beneficial in delaying flow separation.

Still another advantage of the forward swept blade is that it generates nose up moment and additional incidence due to elastic twist resulting in enhanced power production. However, the blade must be optimized and tailored using composite materials (glass or carbon) to avoid any aeroelastic instabilities such as divergence and flutter.

The normal component of the wind speed is $w_n=w_s*\cos(\psi)$. The noise reduction is proportional to $\cos(\psi)^5$. Alternately, one could increase blade rotational speed keeping the same tip speed ratio as for a straight wing. This helps to design lightweight electrical generator.

From all of the foregoing, consider some of the advantages of the proposed passive pitching device vs the fixed blade configuration:

Small wind turbines substantially benefit from the passively pitchable device at economical cost, and Reduced noise is environmentally friendly in urban and rural settings.

Wind energy is environmentally safe and is an inexhaustible source. The proposed wind turbine system is more efficient than its known counterparts and is operable in low wind speed regions. Thus, more geographic regions can be serviced by this wind energy project. The ownership cost of these units is expected to be about half that of comparable units presently on the market.

What is claimed is:

1. A passive pitchable device for wind turbines comprising:
   a camshaft having a plurality of engraved cam grooves;
   said cam grooves are like a half sine wave like groove;
   a cylindrical shell for supporting a blade assembly;
   said blade assembly and said cylindrical shell are fastened together by screws;
   an axial compression spring, which is contained within said cylindrical shell;
   to retrieve the blade to its initial feathering position when the blade is not rotating;
   a plurality of balls that roll along said cam grooves, and convert the axial displacement to rotation or pitch angle;
   wherein said cam grooves determine a smart blade angle with respect to the resultant wind speed vector;
   wherein said axial compression spring returns said smart blade to its initial feathering position when said smart blade is not rotating; and
   wherein the passive pitchable device effectively achieves easy-starting from a stationary state, optimum aerodynamic efficiency at low and design wind speeds and controlled performance at high wind speeds.

2. A passive pitchable device of claim 1, wherein said smart blade is:
   an aeroelastically tailored composite blade having a forward curved leading and trailing edges, which are tapered radically outward;
   said aeroelastically tailored composite blade is comprised of a plurality of glass, carbon fibers, or any combination thereof; and wherein the desired structural strength, elastic twist, stability, low noise, free from tip vortex shedding, reduced drag and improved power conversion efficiency is achieved.

3. A passive pitchable device of claim 1, wherein said blade is comprising:
an aeroelastically tailored composite blade having a forward curved leading and trailing edges and tapered radically outward.

4. A passive pitchable device of claim 3, wherein said aeroelastically tailored composite blade is comprised of a plurality of glass, carbon fibers, or any combination thereof to achieved the desired structural strength, elastic twist, stability, low noise, free from tip vortex shedding, reduced drag and improved power conversion efficiency.

5. A passive pitchable device for wind turbines comprising:
a camshaft having cam grooves engraved;
a cylindrical shell;
an axial compression spring;
means for fastening a blade to a said cylindrical shell;
a plurality of balls that roll along said cam grooves, and convert the axial displacement to rotation or pitch angle; and
wherein the passive pitchable device ensures said blades are at the optimum angle of incidence in the stationary position; as the rotor turns, the net force between centrifugal force on said blade and the resistant force from said compression spring causes the device to move axially outward while rotating to adjust the pitch of the rotor blade so that angle of incidence is optimal for the given wind speed; as the wind speed exceeds the design speed and the centrifugal force on the rotor blade continues to increase, the device continues the move axially outward while rotating in the opposite direction as to adjust the pitch of the blade in the opposite direction so that the rotor performance is controlled and severe dynamic loads are avoided.

6. A passive pitchable device of claim 5, wherein said camshaft has a plurality of cam grooves.

7. A passive pitchable device of claim 5, wherein said camshaft having a plurality of grooves that are designed like a half sine wave engraved in the camshaft.

8. A passive pitchable device of claim 5, wherein said blade has a forward swept leading edge configuration which deforms in an optimally designed manner to minimize vortex shedding and flow separation at the tip sections to minimize induced drag and improve aerodynamic efficiency; said blade tip section provides improved lift distribution and consequently increased power extraction capability.

9. A passive pitchable device of claim 5, wherein said blade is constructed from composite materials such as glass and carbon fiber fabrics to avoid aeroelastic stability problems, which are generally associated with forward swept blade configurations.

10. A method of using a passive pitchable device comprising the steps of:
providing a camshaft having a plurality of engraved cam grooves; a cylindrical shell for supporting a blade assembly; said blade assembly and said cylindrical shell are fastened together by screws; an axial compression spring; said axial compression spring is contained within said cylindrical shell; a plurality of balls that roll along said cam grooves;
wherein said cam grooves determines the blade angle with respect to the resultant wind speed vector;
wherein said plurality of balls that roll along said cam grooves, convert the axial displacement to rotation or pitch angle;
wherein said passive pitchable device ensures said blades are at the optimum angle of incidence in the stationary position; as the rotor turns, the net force between centrifugal force on said blade and the resistant force from said compression spring causes the device to move axially outward while rotating to adjust the pitch of the rotor blade so that angle of incidence is optimal for the given wind speed; as the wind speed exceeds the design speed and the centrifugal force on the rotor blade continues to increase, the device continues the move axially outward while rotating in the opposite direction as to adjust the pitch of the blade in the opposite direction so that the rotor performance is controlled and severe dynamic loads are avoided.

11. A passive pitchable device of claim 10, wherein said grooves on said camshaft are designed in the form of a half sine wave.

12. A passive pitchable device of claim 10, wherein said blade has a forward swept leading edge configuration which deforms in an optimally designed manner to minimize vortex shedding and flow separation at the tip sections to minimize induced drag and improve aerodynamic efficiency; said blade tip section provides improved lift distribution and consequently increased power extraction capability.

13. A passive pitchable device of claim 10, wherein said blade is constructed from composite materials such as glass and carbon fiber fabrics to avoid aeroelastic stability problems, which are generally associated with forward swept blade configurations.

* * * * *